June 27, 1950 A. WRIGHT 2,513,225
POWER SUPPLY SYSTEM
Filed Sept. 6, 1946
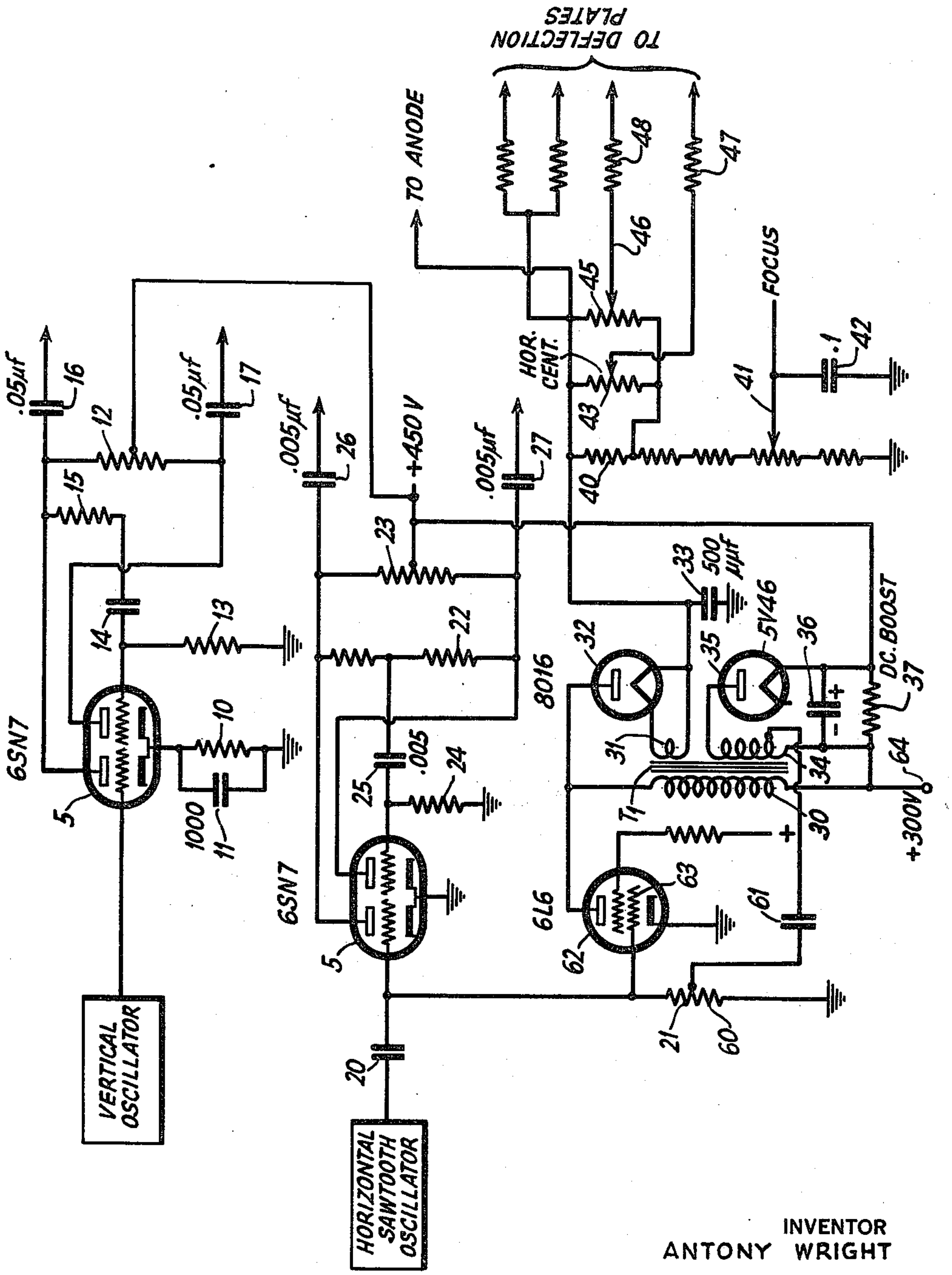
INVENTOR
ANTONY WRIGHT
BY
H. S. Grover.
ATTORNEY Patented June 27, 1950

2,513,225

UNITED STATES PATENT OFFICE 2,513,225

POWER SUPPLY SYSTEM

Antony Wright, Drexel Hill, Pa., assignor to Radio Corporation of America, a corporation of Delaware Application September 6, 1946, Serial No. 695,331

7 Claims. (Cl. 315—19)

My invention relates in general to apparatus for furnishing high voltages and more particularly to apparatus for supplying high voltages, such as are used with cathode ray tubes.

High voltages or potentials of a value that may be used with cathode ray tubes, such as the voltage that is necessary for biasing the anodes of the tube, may be obtained from the normal 60 cycle power supply which is used to energize television transmitting or receiving apparatus. The disadvantage of using this source of supply lies primarily in its cost, since a large filtering apparatus is necessary for use in conjunction therewith, and, in addition, the peak inverse voltage applied to the rectifiers associated therewith is high. Accordingly, it is one of the objects of my invention to provide a high voltage supply which may be used with cathode ray tube apparatus and with which an inexpensive filtering arrangement may be used, and also in which the peak inverse voltages applied to the rectifier associated with the apparatus are considerably lower than with the ordinary power supply systems.

Where cathode ray tube apparatus is used in television home receivers, safety requirements demand that the apparatus be as non-hazardous as possible. It is another of the objects of my invention to supply a high voltage D. C. supply which is suitable for providing biasing potentials for the anodes of a cathode ray tube and in which the requirement of a supplied non-hazardous current is satisfied.

Previously known arrangements in the art to which this invention belongs have attempted to provide high voltage supplies by rectifying a voltage obtained directly from circuits providing the scanning currents used with the cathode ray tube. The disadvantage of this arrangement lies in the fact that the scanning circuits themselves may be affected by the rectification of a portion of the scanning currents used to supply a high voltage source. Accordingly, it is another object of my invention to provide a high voltage supply for use with cathode ray apparatus in which this disadvantage is obviated.

Still a further object of my invention is to provide a circuit whose design may supply a high voltage by use of a single rectifier and also can be used to supply higher potentials by the use of voltage doubling and tripling circuits.

My invention in general contemplates the use of a portion of the sawtooth wave developed for deflecting the beam of a cathode ray tube. This sawtooth wave can be taken from either the sawtooth generator or the deflection circuit itself. A circuit separate and apart from the sawtooth wave generator utilizes a portion of the sawtooth wave coupled thereto to develop an extremely high rectified potential which is easily filtered and which, in addition to its use as an anode bias, may also be used to furnish potential for focusing the cathode ray beam and furnish potentials for electrostatically centering the cathode ray beam. The development of these potentials is accomplished by developing from the horizontal sawtooth deflecting wave, pulses having a sufficiently high potential value.

These pulses are developed by amplifying a sawtooth shaped wave by means of a power tube having an inductive element connected in the output circuit thereof. The long, relatively slow rise of the sawtooth shaped wave does not produce a rectifiable voltage, but the quick collapse of the wave will cause a series of slightly damped waves to be set up, and these may be impressed onto a high voltage rectifier. This series of waves has an extremely high voltage value.

In addition, a D. C. booster circuit is utilized to provide a series additive potential to that obtained from the usual power supply +B circuits. This D. C. boost may be applied in any portion of the receiver circuit requiring more voltage than the +B supply delivers.

My invention will best be understood by reference to the single figure of the drawing which shows one embodiment thereof.

Referring to the drawing, there is shown an arrangement whereby deflecting voltages may be furnished a cathode ray tube, and for purposes of illustration, both vertical and horizontal deflection circuits are shown. While the arrangement shown is particularly adaptable for use with tubes using electrostatic deflection, it may also be used with tubes utilizing electromagnetic deflecting means. In this figure the oscillator for developing the vertical sawtooth shaped deflecting wave is illustrated as a block diagram since there are many forms of oscillator that may be used, and the oscillator per se does not form a part of this invention. The developed sawtooth shaped wave then may be impressed onto a double triode type of tube which, in actual practice, has been a 6SN7 type of tube 5 having the cathodes tied together and grounded through a resistor 10. The resistor is shunted by a condenser 11. The two plates are connected together through resistor 12 and plate bias potential is furnished through a center tap on the latter resistor which is connected to a boosted source of D. C. voltage supply and which will be referred to more fully hereinafter in this specification. One grid of the vacuum tube 5 is grounded through resistor 13 and is connected to the plate of the opposing triode section through condenser 14 and resistor 15. Appropriate coupling condensers 16 and 17 are connected to each end of resistor 12 for coupling the voltages developed across the resistor to the deflecting plates of the cathode ray tube. The output of the sawtooth wave generator is then impressed onto the grid of the other triode section of the tube.

The circuit so described will be easily recognized as an amplifying and phase inverting circuit. When the potential on the grid of the triode section coupled to the sawtooth oscillator rises in accordance with the rise in the developed voltage, the plate current of the triode whose grid is connected to the sawtooth oscillator will rise and the terminal of resistor 22 connected to this plate will experience a drop in potential. Since the grid of the second section is coupled to this plate from a tap on resistor 22 and through capacitor 25, the second grid is opposite in phase to grid one and, as a result, the terminal of resistor 22, which is connected to the plate of the second triode, will experience a rise in potential, or, with respect to the input sawtooth wave, there will be a phase reversal of the wave due to the action of the latter triode. It will be seen, therefore, that a push-pull type of deflecting wave is developed across resistor 22.

The embodiment of my invention is shown associated with the horizontal deflection system. The sawtooth wave developed by the sawtooth generator for furnishing the horizontal deflecting voltages for the cathod ray beam is fed via a coupling condenser 20 to one grid of a 6SN7 type of tube 5 contained in a circuit similar to the one hereinbefore described, which is used for vertical deflection. The values of the circuit components used determine the proper operating characteristics at either vertical or horizontal rate or frequency but the mode of operation in either circuit is the same. The coupling condenser 20 also is connected to a control grid 63 of a 6L6 type of power tube 62, and the grid is grounded through resistors 21 and 60. The cathodes of the 6SN7 tube 5 are tied together and grounded and the plates thereof are connected through two resistors, 22 and 23, the resistors being connected in shunt. The grid of the 6SN7 tube 5 which is not connected with the horizontal sawtooth generator is grounded through resistor 24, as above described with respect to resistor 13, and is connected to a tapped point on resistor 22 through condenser 25. Appropriate coupling condensers 26 and 27 connect the terminals of resistors 22 and 23 to the deflecting system of the cathode ray tube. For purposes of ease and simplicity of illustration, the cathode ray tube per se has not been shown. It should be remembered that other circuits than those shown may be used for the development of proper sawtooth deflection voltages.

The plate of the 6L6 power tube 62 is tied to the plate of the high voltage rectifier tube 32, such as a type 8016. These two plates are connected to an appropriate source of D. C. energizing potential or bias through the primary 30 of a transformer. One secondary 31 of the transformer is connected across the cathode of the rectifier tube 32 and is arranged to energize the cathode filament. The cathode of tube 32 is grounded through resistor 40. In addition the cathode may be connected to the second anode, for instance, of a cathode ray tube (not shown) on whose anode there is desired to be impressed a high biasing potential.

The transformer having the primary winding 30 also has a second secondary winding 34, one end of which is connected to the plate of a rectifying tube 35, such as a tube of the 5V4G type, and the other end of which is connected to the cathode of tube 35 through condenser 36. This condenser is shunted by a resistor 37. The terminal of condenser 36, which is remote from the cathode of tube 35, is connected to the source of direct current supply at terminal 64, which energizes the plates of the power tube and the high voltage rectifier through primary winding 30. The cathode of the rectifier 35 is connected directly to tapped points on resistors 23 and 12 to supply a boosted +B voltage for proper operation of tubes 4 and 5.

The cathode of high voltage rectifier 32 is grounded through tapped voltage divider resistor 40, the latter having associated therewith a slide arm arrangement 41 which in turn is A. C. grounded through condenser 42. Appropriate potentials for focussing the cathode ray beam in the tube may be derived from this sliding arm connecting along resistor 40.

Connected in shunt with a portion of resistor 40 is a potentiometer 43 having slide arm 44, and potentiometer 45 having slide arm 46. Arms 44 and 46 have appropriate series filter resistors 47 and 48 respectively connected thereto. The potential impressed on one of these slide arms may be used for centering the cathode ray beam in the horizontal coordinate and the other slide arm may be used to impress a potential onto the deflecting plates of the tube for centering the cathode ray beam in the vertical coordinate. The operation of the system previously outlined is as follows:

Deflecting voltages may be derived directly from the sawtooth generator through the tubes 4 and 5 in a manner explained hereinbefore, and, accordingly, this will not be elaborated upon. The plates of the power tube 62 and the high voltage rectifier 32 are energized from the source connected at terminal 64, such as a 300 volt source of D. C. potential.

As the sawtooth voltage wave applied to the grid 63 of power tube 62 gradually rises, the plate current of the tube will increase in like manner. The voltage drop across the windings of transformer $T_1$ will be constant during this time as the voltage drop E is equal to L $di/dt$, and $di/dt$ remains constant during the gradual rise of the sawtooth voltage on the grid 63. As the plate current of the tube 62 follows its grid voltage, and a magnetic field is gradually built up around the core of transformer $T_1$, this magnetic field represents stored energy, which is stored during the gradual rise of the plate current in tube 62. At the end of the sawtooth voltage rise, the grid voltage applied to grid 63 of tube 62 is suddenly driven negative. This cuts off the plate current of tube 62 and releases the stored energy in the transformer $T_1$. This sudden release of energy results in a high positive voltage pulse across the primary winding 30 of transformer $T_1$.

The direction of winding of the secondary 34 is connected to provide a negative pulse which is applied to the grid 63 of tube 62 by way of capacitor 61 and resistor 21 to complete cut-off during the pulse period. The rectifier 32 passes more current during the positive pulse and charges capacitor 33 to the peak value of the pulse. The cathode end of capacitor 33 is thus repeatedly charged positive and supplies the voltage for the second anode of the cathode ray tube.

Following the initial positive pulse on the anode of tube 62 is a transient or undamped wave train caused by the ringing of resonant circuits. The natural period is determined by the primary inductance of $T_1$ and its distributed capacity in combination with the reflected capacity from the secondary winding. Thus, following the initial pulse, the polarity of the voltages across the various windings of transformer $T_1$ reverses momentarily. This causes the voltage on the plate of the rectifier 35 to go positive, charging the capacitor 36 in shunt with resistor 37. The terminal of the capacitor 36 connected to the cathode of tube 35 is charged positive. As the opposite end of capacitor 36 is connected to the plus 300 volts, the charge in capacitor 36 adds to the 300 volts, thus producing a voltage boost which can be used to supply the deflection tubes 4 and 5 with the required additional voltage. The potential appearing across resistor 40 then may be utilized in well known manner to provide various potential values that may be desired in the operation of the cathode ray tube as, for instance, a part of the potential may be used to center the cathode ray beam, and by centering is meant to place the cathode ray beam in an initial desired position from which deflection may take place in any desired manner. It should not be considered that by centering is meant that the beam must be placed in the exact center of any electrode or other responsive member upon which it impinges. In addition to the high voltage which may be derived for energizing the anodes of the cathode ray tube, potentials may also be derived from this device which may be utilized for energizing focusing apparatus usually associated with the tubes.

The plates of the output tubes 4 and 5 demand a 450 volt potential. Since some few of the elements in a home television receiver use a 300 volt supply source for the energizing potentials, it is necessary that a source of potential of this value be supplied. On the other hand, the 450 volt potential is not widely used in the receiver, but, in the present arrangement, is necessary for the development of deflection potentials for the electrostatic deflecting means in the cathode ray tube. If a complete 450 volts power pack is furnished, the cost thereof is considerably higher than the cost will be if a 300 volt power supply can be utilized, since with the 450 volt pack larger transformers are necessary, electrolytic condensers are necessary, and which are costly, and the entire filtering arrangement associated with the power pack will cost a great deal more. The present arrangement will allow the use of a 300 volt power supply in general rather than a 450 volt one.

While there has been illustrated in this specification a high voltage derivation system triggered by the sawtooth generator which energizes the circuits used for producing the deflecting potentials for an electrostatically deflected cathode ray tube, it will be appreciated that the invention is not limited to the use of the circuit shown in combination with any specific oscillator or generator. A separate oscillator producing a sawtooth wave form could be provided, if desired, for operating at a frequency other than the horizontal scanning frequency of the receiver with which it might be associated. However, since the horizontal scanning frequency is normally of the order of 15,750 cycles, and since an oscillator of this nature is necessary in television receivers, the sawtooth derived from the scanning oscillator itself can be used for purposes of convenience. The use of an arrangement such as the present invention can be utilized, for instance, to produce high second anode potentials for electromagnetically deflected tubes, the circuit being, in this instance, disassociated from the circuits producing the necessary sawtooth currents in the deflection yoke coils provided for electromagnetic deflection. The invention, in this instance, offers an obvious advantage considering the reflective effects of a high voltage developing circuit operating from circuits employed to produce sawtooth currents in deflection yokes.

Having now described the invention, what is claimed and desired to be secured by Letters Patent is the following:

1. In cathode ray tube apparatus wherein there is provided means for generating and deflecting the cathode ray beam in at least one coordinate of motion, means for supplying a substantially sawtooth shaped voltage wave, means responsive to at least a portion of the sawtooth shaped voltage wave and utilizing a bias of predetermined value, means for deriving a series of recurring waves from the sawtooth shaped voltage waves, a biasing source connected to the means for developing the derived waves, first means responsive to said derived waves for rectifying the waves to supply a voltage of comparatively high value suitable for accelerating and focusing the aforementioned cathode ray beam, a second rectifying means responsive to a portion of the derived waves to develop a substantially constant voltage of relatively low value, and means for impressing at least a portion of the combined voltage onto the means utilizing the bias of predetermined value to supply the bias therefor.

2. Apparatus in accordance with claim 1 wherein the means responsive to the sawtooth shaped voltage waves and utilizing a bias of predetermined value comprises a pair of thermionic devices, each having anode and cathode and at least one control electrode, and wherein the sawtooth shaped waves are impressed onto one of the grid elements of one of the thermionic devices, and wherein there is provided an output circuit connected between the anodes of both of the thermionic devices for deriving a push-pull sawtooth shaped output voltage for electrostatically deflecting a cathode ray beam.

3. In cathode ray apparatus wherein means are provided for generating, accelerating, and deflecting a cathode ray beam, means for supplying recurring waves having a substantially sawtooth shape, a pair of thermionic devices, each having anode, cathode, and control electrodes, means to impress a portion of the sawtooth shaped waves on to a control electrode of the first of the thermionic devices, tapped load means connecting the anodes of both of said thermionic devices, means electrically connecting the control electrode of the second of said thermionic devices to the anode of the first of said thermionic devices, a third thermionic device having anode, cathode and at least one control electrode, means for impressing a portion of the sawtooth shaped waves onto a control electrode of said third thermionic device, inductive means connected in the anode-cathode circuit of the third thermionic device, a first rectifier having anode and cathode electrodes, means electrically connecting the anode of the rectifier to a point on the inductive means, means connected to the cathode of the rectifier and coupled to the inductive means for energizing the rectifier cathode, load means connected to the rectifier, filter means connected to the rectifier for smoothing the output thereof, a second rectifier having anode and cathode electrodes, electrical storage means connected in the anode-cathode circuit of the second rectifier, means coupling the inductive means to the second rectifier for impressing energy onto the rectifier and charging the electrical storage means, a source of energizing potential of predetermined value for energizing the anode of the third thermionic device, means for additively combining at least a portion of the voltage across the electrical storage means with the source of energizing potential, and means for utilizing the combined voltage as a source of energizing potential for energizing the anodes of the first and second thermionic devices.

4. In cathode ray apparatus wherein there is provided means for generating, accelerating, and deflecting a cathode ray beam, means for supplying sawtooth shaped voltage waves, means for deriving recurring pulses having a relatively high voltage value from said sawtooth shaped voltage waves, rectifier means associated with said latter means for developing a high voltage direct current from the derived pulses, load means energized by said rectifier and having a high voltage impressed thereon by said rectifier, means for deriving from said load means a high biasing voltage to bias the means for accelerating the cathode ray beam, means for deriving from said load means a biasing voltage for centering the cathode ray beam, a first source of biasing voltage utilized by the means for deriving the voltage pulses from the sawtooth shaped voltage waves, apparatus for developing a push-pull type of deflecting wave from the sawtooth shaped voltage supply and using a bias having a value differing from that of the first biasing source, a second rectifier means responsive to the means for developing the derived pulses, an electrical energy storage means charged by the latter rectifier and means for additively combining the voltage developed across said electrical energy storage means with that of the first bias source to supply the bias for the means for developing the push-pull type of deflecting wave.

5. A high voltage D. C. supply source comprising an oscillator, a charging tube, electrostatic means coupling the output of said oscillator to said charging tube, inductive means connected in the output circuit of said charging tube and having energy supplied thereto by said tube, means to allow the energy stored in said inductive means by said tube to develop a high potential by the free oscillation of said energy in said inductance, rectifier means, means to apply the developed high potential to said rectifier means, and means coupling the output of said inductive means to said charging tube to positively block the charging tube and prevent the feed back of energy to said oscillator while the energy in said inductive member is undergoing free oscillation.

6. In television apparatus a scanning oscillator, a charging tube having anode, cathode, and control electrodes, electrostatic means coupling said oscillator to the input of said charging tube, inductive means connected in the anode-cathode circuit of said charging tube whereby energy is stored in said inductive means by the plate current of the tube, rectifying means energized by said inductive means when the storing of energy in the inductive means is interrupted, and feed back means from the output of said inductive means to the input circuit of said charging tube to positively block the tube when the storing of energy in said inductive means is interrupted to prevent reflective effects on the scanning oscillator.

7. A circuit arrangement for developing a high fixed potential comprising an oscillator, a charging tube, means for coupling at least part of the output of said oscillator to the charging tube, an inductance connected in series with said charging tube, a rectifier adapted to rectify alternating current present in said inductance, and means for positively cutting off the conduction of said charging tube in response to a decay in a magnetic field established about said inductance by the current in said charging tube.

ANTONY WRIGHT.

REFERENCES CITED

The following references are of record in the file of this patent:

UNITED STATES PATENTS

| Number | Name | Date |
|---|---|---|
| 2,074,495 | Vance | Mar. 23, 1937 |
| 2,265,620 | Bahring | Dec. 9, 1941 |
| 2,284,378 | Dome | May 26, 1942 |
| 2,352,988 | Wilcox | July 4, 1944 |
| 2,391,862 | Boyle | Jan. 1, 1946 |
| 2,412,683 | Mesner | Dec. 17, 1946 |